(12) United States Patent
Li et al.

(10) Patent No.: US 9,119,421 B2
(45) Date of Patent: Sep. 1, 2015

(54) CIGARETTE WRAPPER WITH PRINTED CATALYST

(75) Inventors: Ping Li, Richmond, VA (US); Shalva Gedevanishvili, Richmond, VA (US); Firooz Rasouli, Midlothian, VA (US); Weijun Zhang, Richmond, VA (US); Rajesh K. Garg, Richmond, VA (US); Hector Alonso, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 2096 days.

(21) Appl. No.: 10/560,396

(22) PCT Filed: Jun. 14, 2004

(86) PCT No.: PCT/US2004/018854
§ 371 (c)(1),
(2), (4) Date: Nov. 2, 2006

(87) PCT Pub. No.: WO2005/002370
PCT Pub. Date: Jan. 13, 2005

(65) Prior Publication Data
US 2007/0095358 A1    May 3, 2007

Related U.S. Application Data

(60) Provisional application No. 60/477,922, filed on Jun. 13, 2003.

(51) Int. Cl.
*A24C 1/42*    (2006.01)
*A24D 1/02*    (2006.01)
(Continued)

(52) U.S. Cl.
CPC ............... *A24D 1/025* (2013.01); *A24B 15/28* (2013.01); *A24B 15/282* (2013.01);
(Continued)

(58) Field of Classification Search
None
See application file for complete search history.

(56) References Cited

U.S. PATENT DOCUMENTS 2,755,207 A    7/1956    Frankenburg
3,636,027 A *  1/1972    Smith ........................... 560/342
(Continued)

FOREIGN PATENT DOCUMENTS

JP    2004-508068 A    3/2004
WO    WO 87/06104    10/1987
(Continued)

OTHER PUBLICATIONS

Richard R. Baker, "Mechanisms of Smoke Formation and Delivery," *Recent Advances in Tobacco Science*, vol. 6, 184-224 (1980).
(Continued)

*Primary Examiner* — Richard Crispino
*Assistant Examiner* — Phu Nguyen
(74) *Attorney, Agent, or Firm* — Buchanan, Ingersoll & Rooney PC

(57) ABSTRACT

A wrapper for a smoking article includes a web; and a patterned deposit on at least a portion of one surface of the wrapper, wherein the patterned deposit comprises catalyst particles. The patterned deposit can include a nanoparticle catalyst that is capable of catalyzing the conversion of a constituent gas component in the mainstream and/or sidestream smoke of the smoking article. The constituent gas component can be carbon monoxide and/or nitric oxide and the catalyst particles can be iron oxide. Also provided is a smoking article comprising a tobacco rod having a wrapper formed around the tobacco rod, the wrapper including a patterned deposit on at least a portion of one surface of the wrapper. A method of making the wrapper and a method of making a smoking article utilizing the wrapper are also provided.

5 Claims, 6 Drawing Sheets

(51) Int. Cl.
*A24B 15/28* (2006.01)
*A24C 5/00* (2006.01)
*C09D 11/03* (2014.01)

(52) U.S. Cl.
CPC ............ *A24B 15/286* (2013.01); *A24B 15/287* (2013.01); *A24B 15/288* (2013.01); *A24C 5/005* (2013.01); *A24D 1/02* (2013.01); *C09D 11/03* (2013.01)

(56) References Cited

U.S. PATENT DOCUMENTS

| | | |
|---|---|---|
| 3,720,214 A | 3/1973 | Norman et al. |
| 3,807,416 A | 4/1974 | Hedge et al. |
| 3,931,824 A | 1/1976 | Miano et al. |
| 4,108,151 A | 8/1978 | Martin et al. |
| 4,109,663 A | 8/1978 | Maeda et al. |
| 4,119,104 A | 10/1978 | Roth |
| 4,182,348 A | 1/1980 | Seehofer et al. |
| 4,195,645 A | 4/1980 | Bradley, Jr. et al. |
| 4,197,861 A | 4/1980 | Keith |
| 4,450,847 A | 5/1984 | Owens |
| 4,453,553 A | 6/1984 | Cohn |
| 4,489,739 A | 12/1984 | Mattina, Jr. et al. |
| 4,619,278 A * | 10/1986 | Smeed et al. ............... 131/284 |
| 4,744,374 A | 5/1988 | Deffeves et al. |
| 5,101,839 A | 4/1992 | Jakob et al. |
| 5,105,836 A | 4/1992 | Gentry et al. |
| 5,129,408 A | 7/1992 | Jakob et al. |
| 5,143,098 A | 9/1992 | Rogers et al. |
| 5,211,684 A | 5/1993 | Shannon et al. |
| 5,284,166 A | 2/1994 | Cartwright et al. |
| 5,322,075 A | 6/1994 | Deevi et al. |
| 5,345,951 A | 9/1994 | Serrano et al. |
| 5,386,838 A | 2/1995 | Quincy, III et al. |
| 5,388,594 A | 2/1995 | Counts et al. |
| 5,499,636 A | 3/1996 | Baggett, Jr. et al. |
| 5,591,368 A | 1/1997 | Fleischhauer et al. |
| 5,598,868 A | 2/1997 | Jakob et al. |
| 5,666,976 A | 9/1997 | Adams et al. |
| 5,671,758 A | 9/1997 | Rongved |
| 5,692,525 A | 12/1997 | Counts et al. |
| 5,692,526 A | 12/1997 | Adams et al. |
| 5,728,462 A | 3/1998 | Arino et al. |
| 5,915,387 A | 6/1999 | Baggett, Jr. et al. |
| 5,934,289 A | 8/1999 | Watkins et al. |
| 5,988,176 A | 11/1999 | Baggett, Jr. et al. |
| 6,026,820 A | 2/2000 | Baggett, Jr. et al. |
| 6,053,176 A | 4/2000 | Adams et al. |
| 6,095,152 A | 8/2000 | Beven et al. |
| 6,138,684 A | 10/2000 | Yamazaki et al. |
| 6,286,516 B1 | 9/2001 | Bowen et al. |
| 6,371,127 B1 | 4/2002 | Snaidr et al. |
| 2002/0002979 A1 | 1/2002 | Bowen et al. |
| 2002/0062834 A1 | 5/2002 | Snaidr et al. |
| 2002/0179106 A1* | 12/2002 | Zawadzki et al. ............. 131/365 |
| 2003/0000538 A1* | 1/2003 | Bereman ...................... 131/352 |
| 2003/0037792 A1 | 2/2003 | Snaidr et al. |
| 2003/0131859 A1* | 7/2003 | Li et al. ......................... 131/364 |

FOREIGN PATENT DOCUMENTS

| | | |
|---|---|---|
| WO | WO 00/40104 | 7/2000 |
| WO | WO 02/24005 A2 | 3/2002 |
| WO | WO 02/24006 A2 | 3/2002 |

OTHER PUBLICATIONS

Richard R. Baker, "Variation of the Gas Formation Regions Within a Cigarette Combustion Coal During the Smoking Cycle," *Beiträge zur Tabakforschung International*, vol. 11, No. 1, 1-17 (1981).

An Official Action issued Dec. 14, 2009, in corresponding Japanese Patent Application No. 2006-533781, together with an English language translation of the pertinent portions thereof.

* cited by examiner

CIGARETTE WRAPPER WITH PRINTED CATALYST

This application is a national stage application under 35 USC §371 of International Application Number PCT/US2004/018854, filed Jun. 14, 2004, the international application being published in English. This application also claims priority under 35 USC §119 to U.S. Provisional Application No. 60/477,922, filed Jun. 13, 2003.

BACKGROUND

This application claims priority under 35 USC §119 to U.S. Provisional Application No. 60/477,922 entitled CIGARETTE WRAPPER WITH CATALYTIC FILLER AND METHODS OF MAKING SAME and filed on Jun. 13, 2003, the entire content of which is hereby incorporated by reference.

In the description that follows reference is made to certain structures and methods, however, such references should not necessarily be construed as an admission that these structures and methods qualify as prior art under the applicable statutory provisions. Applicants reserve the right to demonstrate that any of the referenced subject matter does not constitute prior art.

Smoking articles, such as cigarettes or cigars, produce both mainstream smoke during a puff and sidestream smoke during static burning. Constituent of both mainstream smoke and sidestream smoke are carbon monoxide (CO), nitric oxide (NO) and particulate matter (e.g., tar). The reduction of carbon monoxide, nitric oxide and particulate matter in cigarette smoke is desirable.

Catalysts, sorbents, and/or oxidants for smoking articles are disclosed in the following: U.S. Pat. No. 6,371,127 issued to Snider et al., U.S. Pat. No. 6,286,516 issued to Bowen et al., U.S. Pat. No. 6,138,684 issued to Yamazaki et al., U.S. Pat. No. 5,671,758 issued to Rongved, U.S. Pat. No. 5,386,838 issued to Quincy, III et al., U.S. Pat. No. 5,211,684 issued to Shannon et al., U.S. Pat. No. 4,744,374 issued to Deffeves et al., U.S. Pat. No. 4,453,553 issued to Cohn, U.S. Pat. No. 4,450,847 issued to Owens, U.S. Pat. No. 4,182,348 issued to Seehofer et al., U.S. Pat. No. 4,108,151 issued to Martin et al., U.S. Pat. No. 3,807,416, and U.S. Pat. No. 3,720,214. Published applications WO 02/24005, WO 87/06104, WO 00/40104 and U.S. Patent Application Publication Nos. 2002/0002979 A1, 2003/0037792 A1 and 2002/0062834 A1 also refer to catalysts, sorbents, and/or oxidants.

Iron and/or iron oxide has been described for use in tobacco products (see e.g., U.S. Pat. Nos. 4,197,861; 4,489,739 and 5,728,462). Iron oxide has been described as a coloring agent (e.g., U.S. Pat. Nos. 4,119,104; 4,195,645; 5,284,166) and as a burn regulator (e.g., U.S. Pat. Nos. 3,931,824; 4,109,663 and 4,195,645) and has been used to improve taste, color and/or appearance (e.g., U.S. Pat. Nos. 6,095,152; 5,598,868; 5,129,408; 5,105,836 and 5,101,839).

Despite the developments to date, there remains an interest in improved and more efficient methods and compositions for reducing the amount of gas constituents in the mainstream and/or sidestream smoke of a smoking article.

SUMMARY

Provided is a smoking article comprising a tobacco rod having a wrapper formed around the tobacco rod, the wrapper including a patterned deposit on at least a portion of one surface of the wrapper, wherein the patterned deposit comprises catalyst particles capable of catalyzing, oxidizing and/or reducing a constituent gas component in the mainstream and/or sidestream smoke of the smoking article. In smoking articles comprising the wrapper, the concentration in mainstream and/or sidestream smoke of carbon monoxide, nitric oxide and/or total particulate matter can be reduced.

In a preferred embodiment, a wrapper for a smoking article comprises a web and a patterned deposit on at least a portion of one surface of the wrapper, wherein the patterned deposit comprises catalyst particles. A plurality of wrappers can comprise a sheet of cigarette wrapping paper.

A method of manufacturing cigarette paper with a patterned deposit of catalyst particles comprises (i) forming a sheet of cigarette paper in a papermaking machine; and (ii) depositing catalyst particles on at least a portion of a surface of a wrapper to form a patterned deposit of the particles on the wrapper. In a preferred embodiment the catalyst particles are deposited without using a binder and are hydrogen bonded to the wrapper (e.g., bonded to the web comprising the wrapper).

Preferably, the catalyst particles comprise nanoscale particles, which can have an average particle size of less than about 5 microns, preferably less than about 50 μm, most preferably less than about 10 nm. The catalyst particles are preferably metal oxides such as iron oxide (e.g., FeOOH, $Fe_3O_4$, $\alpha$-$Fe_2O_3$, $\gamma$-$Fe_2O_3$, FeO or mixtures thereof), although the catalyst particles can comprise at least one oxide of at least one element selected from the group consisting of B, Al, Si, Ti, Fe, Co, Ni, Cu, Zn, Ge, Zr, Nb, Mo, Ru, Rh, Pd, Ag, Sn, Ce, Hf, Ta, W, Re, Os, Ir, Pt and Au. The catalyst particles can comprise particles of a first oxide supported on particles of a second compound (e.g., iron oxide particles supported on calcium carbonate particles).

The deposit preferably includes a pattern having a plurality of discrete features such as an alphanumeric sequence, a pictogram or geometric shapes, which can repeat along the length of the paper. A pattern can comprise a random or regular array of features. A first portion of the pattern can have a first concentration of catalyst particles and a second portion of the pattern can have a second concentration of catalyst particles. Furthermore, the catalyst-patterned paper can be provided with a gradient in the amount of catalyst along the length of the paper and/or perpendicular to the plane of the paper.

The catalyst particles can be deposited on an inner and/or outer surface of the wrapper. Also, a smoking article can have a second wrapper having deposited thereon a different catalyst and/or a different amount of catalyst than on the first wrapper. The permeability of a preferred wrapper is no less than 15 CORESTA units and the preferred areal coverage of catalyst on the wrapper is less than about 90% or less than about 50% of the total surface area of the wrapper. The catalyst particles can cover greater than about 1% or greater than about 5% of the total surface area of the wrapper. In a preferred embodiment, the features of the catalyst pattern on the wrapper repeat such that the largest area of uncoated wrapper does not exceed a circular area having a diameter of 10 mm, more preferably a diameter of 1 micron.

An exemplary smoking article comprises less than about 10 mg of the catalyst per smoking article or less than about 100 mg of the catalyst per smoking article. The catalyst can be incorporated into a smoking article in an amount effective to reduce the concentration in mainstream and/or sidestream smoke of carbon monoxide, nitric oxide and/or other smoke constituents by at least 10% or by at least 25%.

A preferred method of making a smoking article comprises (i) depositing catalyst particles on at least a portion of a surface of a wrapper to form a patterned deposit of the particles on the wrapper; (ii) providing a cut filler comprising tobacco to a cigarette making machine; and (iii) placing the wrapper including the patterned deposit around the cut filler to form a tobacco rod portion of the smoking article.

The catalyst particles can be deposited by gravure printing, rotogravure printing, photogravure printing, screen printing, flexographic printing, relief printing, intaglio printing, lithographic printing, spraying, brushing, rolling or size press techniques. The catalyst particles can be deposited by dispersing the particles in a liquid (e.g., alcohols, water and/or other solvents) to form a mixture and depositing the mixture on the wrapper, or by depositing dry particles on a base web of a wrapper.

Optionally, the catalyst particles can be deposited on a wrapper in the form of a catalytic ink which includes a pigment. The catalytic ink preferably comprises a liquid and a nanoparticle catalyst suspended in the liquid.

BRIEF DESCRIPTION OF THE DRAWING FIGURES

FIGS. 3(a) to 3(e) illustrate exemplary discrete features and/or patterns of catalyst particles on a wrapper for a smoking article.

Figure 4:
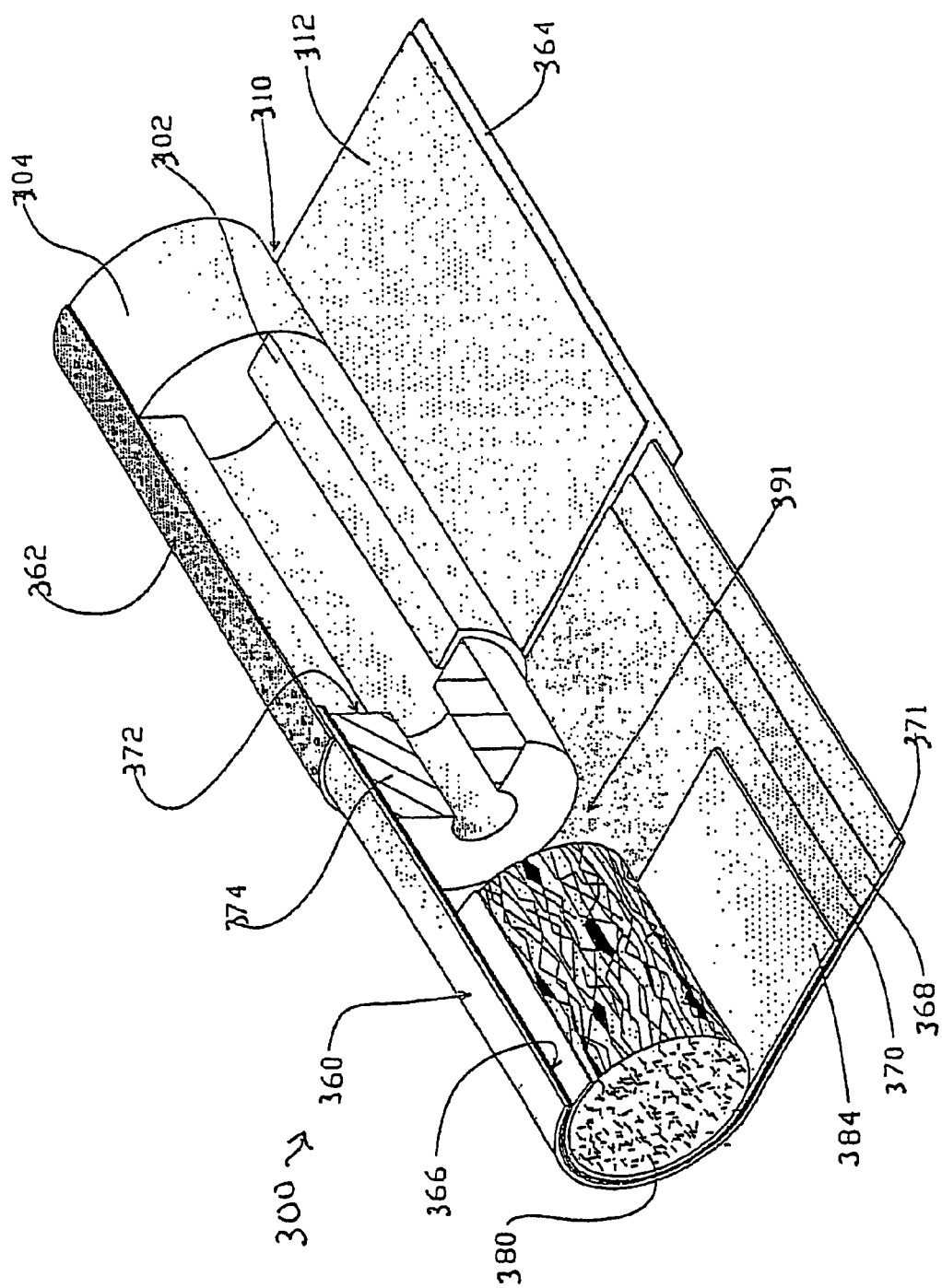

FIG. 4 illustrates an exemplary construction of a cigarette, which can be used with an electrical smoking device.

Figure 5:
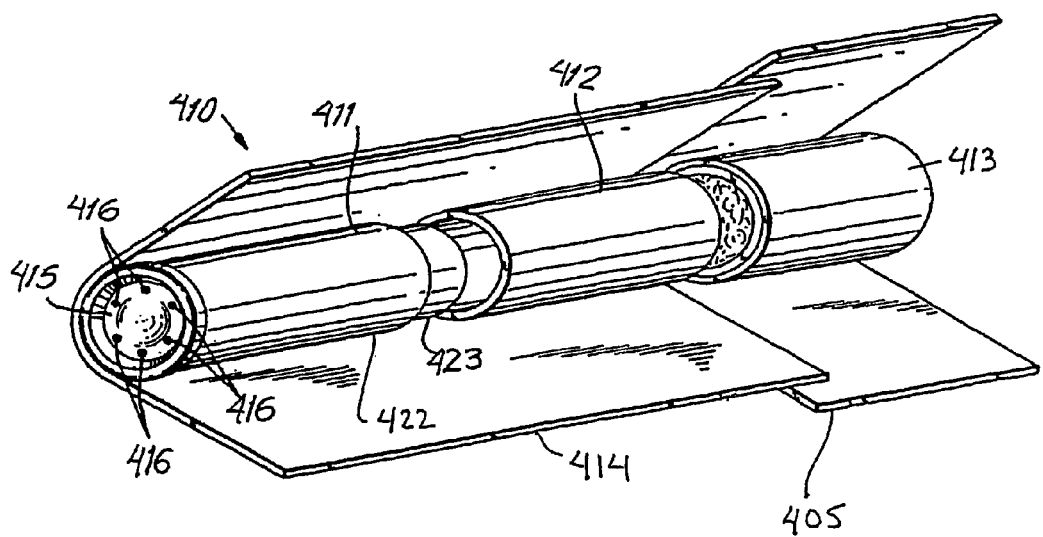

FIG. 5 is a perspective view of a cigarette having catalyst modified paper surrounding a fuel element.

Figure 6:
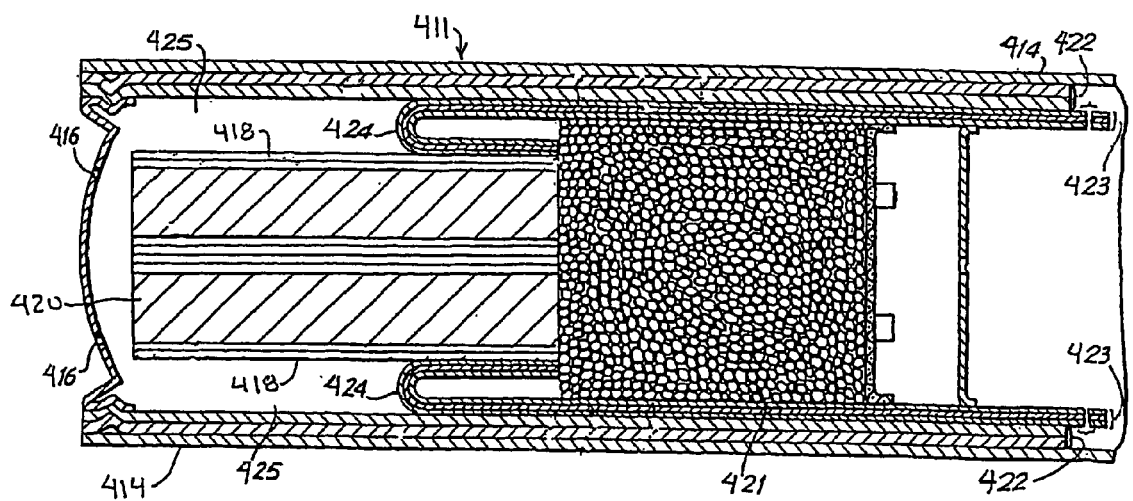

FIG. 6 shows a cross-sectional view of the cigarette shown in FIG. 5.

Figure 7:
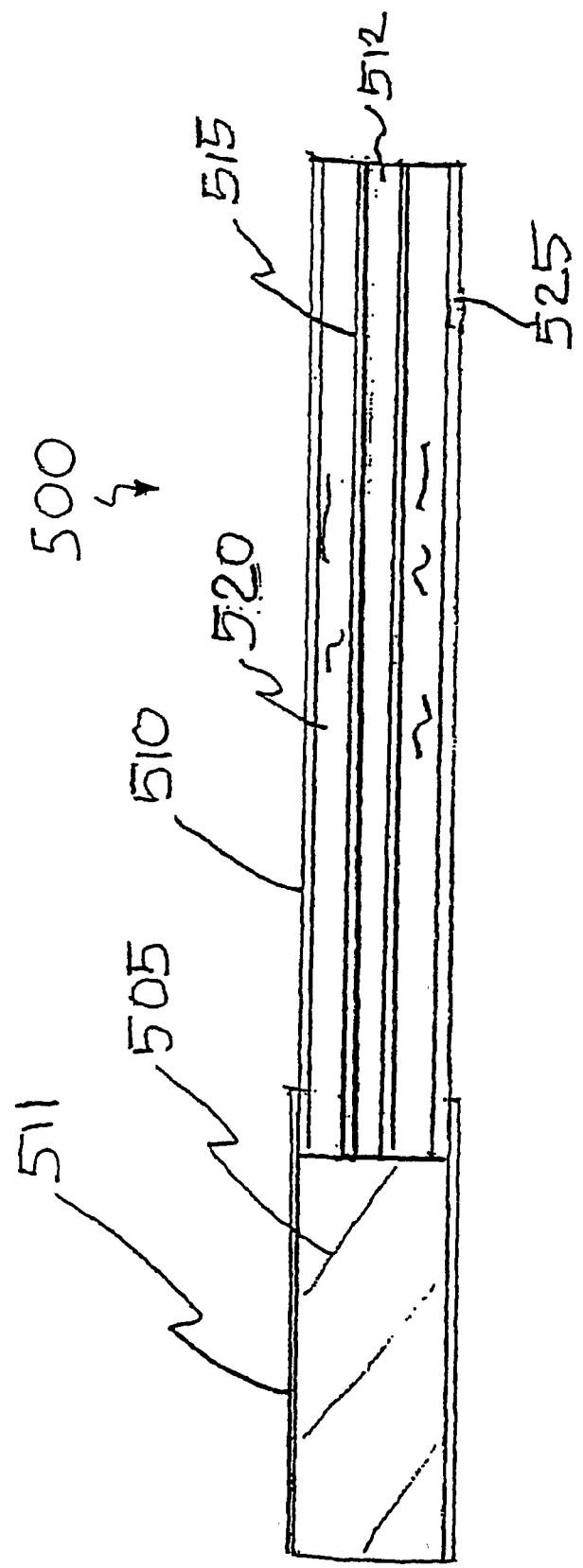

FIG. 7 illustrates a cigarette having a concentric tobacco.

DETAILED DESCRIPTION OF THE PREFERRED EMBODIMENTS

Smoking articles comprising a wrapper, wrappers adapted for use in smoking articles and methods for making smoking articles and wrappers involve a patterned deposit of catalyst particles on at least one surface of the wrapper. The catalyst particles are capable of converting one or more gas constituents in the mainstream and/or sidestream smoke of the smoking article. For example, by providing a wrapper with the patterned deposit of catalyst particles, the amount of carbon monoxide, nitric oxide and/or total particulate matter in mainstream and/or sidestream smoke can be reduced. By "deposit" is meant that the catalyst particles are dispersed on a surface of the wrapper.

Preferably, the catalyst particles comprise nanoparticles. By "nanoparticles" is meant that the particles have an average particle diameter of less than about 500 nanometers, preferably less than about 50 nm, more preferably less than about 10 nm. The catalyst particles comprise at least one oxide of at least one element selected from the group consisting of B, Al, Si, Ti, Fe, Co, Ni, Cu, Zn, Ge, Zr, Nb, Mo, Ru, Rh, Pd, Ag, Sn, Ce, Hf, Ta, W, Re, Os, Ir, Pt and Au. Preferred catalyst particles are iron oxide particles (e.g., nanoscale iron oxide particles.). A preferred nanoparticle iron oxide catalyst is NANOCAT® Superfine Iron Oxide, available from Mach I,
Inc., of King of Prussia, Pa. The nanoparticle iron oxide catalyst can comprise FeOOH, $Fe_3O_4$, $\alpha$-$Fe_2O_3$, $\gamma$-$Fe_2O_3$, FeO or mixtures thereof.

An embodiment relates to a method of making cigarette paper with a patterned deposit of catalyst particles, the method comprising forming a sheet of cigarette paper in a papermaking machine and depositing catalyst particles on at least a portion of a surface of the paper to form a patterned deposit of the particles on the paper. Such a paper wrapper is used to assemble a smoking article, such as a cigarette, and is consumed during smoking. Patterned deposits of catalyst particles can be deposited as dry particles onto a base web of a wrapper. In a further embodiment, the catalyst particles can be combined with a liquid to form a slurry and the slurry can be deposited on at least a portion of one surface of the wrapper. Preferably, the slurry consists of the liquid and the catalyst particles (i.e., the slurry is free of a binder).

A further embodiment relates to method of making a smoking article, comprising (i) depositing catalyst particles on at least a portion of a surface of a wrapper to form a patterned deposit of the particles on the wrapper; (ii) providing a cut filler comprising tobacco to a cigarette making machine; and (iii) placing the wrapper including the patterned deposit around the cut filler to form a tobacco rod portion of the smoking article.

While not wishing to be bound by theory, it is believed that during smoking, the patterned deposit of particles such as iron oxide nanoscale particles can catalyze the conversion of carbon monoxide to carbon dioxide via reaction with oxygen in the gas stream of the smoking article according to the equation 2 $CO+O_2=2CO_2$. The particles can also convert (e.g., reduce) nitric oxide to nitrogen according to the reaction $2NO+2CO \rightarrow 2CO_2+N_2$.

It is also believed that subsequent to the catalytic reaction(s), the particles may also act as an oxidant that can convert CO to $CO_2$ in the absence of oxygen in order to reduce the level of CO in the mainstream and/or sidestream smoke. As used herein, a catalyst is capable of affecting the rate of a chemical reaction, e.g., a catalyst can increase the rate of oxidation of carbon monoxide without participating as a reactant or product of the reaction. An oxidant is capable of oxidizing a reactant, e.g., by donating oxygen to the reactant, such that the oxidant itself is reduced. A reducing agent is capable of reducing a reactant, e.g., by receiving oxygen from the reactant, such that the reducing agent itself is oxidized. The catalyst particles can also reduce the total particulate matter (TPM) (e.g., tar) in the gas stream.

Preferably, the catalyst particles are deposited on the wrapper of a smoking article in an amount effective to reduce the concentration in mainstream and/or sidestream smoke of carbon monoxide, nitric oxide and/or total particulate matter by at least 5% (e.g., by at least 10%, 15%, 20%, 25%, 30%, 35%, 40%, 45%, 50%, 55%, 60%, 65%, 70%, 75%, 80%, 85%, 90% or 95%).

"Smoking" of a cigarette means the heating or combustion of the cigarette to form smoke, which can be drawn through the cigarette. Generally, smoking of a cigarette involves lighting one end of the cigarette and, while the tobacco contained therein undergoes a combustion reaction, drawing smoke from the combustion through the mouth end of the cigarette. The cigarette may also be smoked by other means. For example, the cigarette may be smoked by heating the cigarette and/or heating using electrical heater means as described in commonly-assigned U.S. Pat. Nos. 6,053,176; 5,934,289; 5,591,368 or 5,322,075.

The term "mainstream" smoke refers to the mixture of gases passing down the tobacco rod and issuing through the filter end, i.e., the amount of smoke issuing or drawn from the mouth end of a cigarette during smoking of the cigarette. The mainstream smoke contains smoke that is drawn in through both the lighted region, as well as through the cigarette paper wrapper. The term "sidestream" smoke refers to the mixture of gases issuing from the tobacco rod through the cigarette paper wrapper and/or from the burning coal of the tobacco rod at the lit end.

Several factors contribute to the formation of carbon monoxide in a cigarette. In addition to the constituents in the tobacco, the temperature and the oxygen concentration in a cigarette during combustion can affect the formation and reaction of carbon monoxide and carbon dioxide. The total amount of carbon monoxide formed during smoking comes from a combination of three main sources: thermal decomposition (about 30%), combustion (about 36%) and reduction of carbon dioxide with carbonized tobacco (at least 23%). Formation of carbon monoxide from thermal decomposition, which is largely controlled by chemical kinetics, starts at a temperature of about 180° C. and finishes at about 1050° C. Formation of carbon monoxide and carbon dioxide during combustion is controlled largely by the diffusion of oxygen to the surface ($k_a$) and via a surface reaction ($k_b$). At 250° C., $k_a$ and $k_b$, are about the same. At 400° C., the reaction becomes diffusion controlled. Finally, the reduction of carbon dioxide with carbonized tobacco or charcoal occurs at temperatures around 390° C. and above.

During smoking there are three distinct regions in a cigarette: the combustion zone, the pyrolysis/distillation zone, and the condensation/filtration zone. While not wishing to be bound by theory, it is believed that the patterned deposit of catalyst particles can target the various reactions that occur in different regions of the cigarette during smoking. The patterned deposit of catalyst particles can convert CO to $CO_2$ in the absence or presence of an external source of oxygen.

First, the combustion zone is the burning zone of the cigarette produced during smoking of the cigarette, usually at the lighted end of the cigarette. The temperature in the combustion zone ranges from about 600° C. to about 950° C., and the heating rate can be as high as 500° C./second. The concentration of oxygen is low in the combustion zone because oxygen is being consumed in the combustion of tobacco to produce carbon monoxide, carbon dioxide, water vapor and various organic compounds. The low oxygen concentration coupled with the high temperature leads to the reduction of carbon dioxide to carbon monoxide by the carbonized tobacco. In this region, the catalyst particles can convert carbon monoxide to carbon dioxide via an oxidation and/or catalysis mechanism. The combustion zone is highly exothermic and the heat generated is carried to the pyrolysis/distillation zone.

The pyrolysis zone is the region behind the combustion zone, where the temperature ranges from about 200° C. to about 600° C. In the combustion zone the catalyst particles can also directly oxidize the conversion of CO to $CO_2$ and/or reduce NO to $N_2$. The major reaction is the pyrolysis (i.e., the thermal degradation) of the tobacco that produces carbon monoxide, carbon dioxide, smoke components and charcoal using the heat generated in the combustion zone. There is some oxygen present in this region, and thus the catalyst particles may catalyze the oxidation of carbon monoxide to carbon dioxide. The catalytic reaction begins at about 50° C. and reaches maximum activity around 150 to 300° C. and maintains its maximum activity at temperatures above about 300° C.

In the condensation/filtration zone the temperature ranges from ambient to about 150° C. The major process in this zone is the condensation/filtration of the smoke components. Some amount of carbon monoxide, carbon dioxide and nitric oxide diffuse out of the cigarette and some oxygen diffuses into the cigarette. The partial pressure of oxygen in the condensation/filtration zone does not generally recover to the atmospheric level. In the relatively low temperature condensation/filtration zone, the catalyst particles may optionally catalyze the conversion of carbon monoxide to carbon dioxide and/or nitric oxide to nitrogen.

During the smoking of a cigarette, carbon monoxide and nitric oxide in mainstream smoke flow toward the filter end of the cigarette. As these gases travel within the cigarette, oxygen diffuses into and carbon monoxide and nitric oxide diffuse out of the cigarette through the wrapper. After a typical 2-second puff of a cigarette, CO and NO are concentrated in the periphery of the cigarette, i.e., near the cigarette wrapper, in front of the combustion zone. Due to diffusion of $O_2$ into the cigarette, the oxygen concentration is also high in the peripheral region. Airflow into the tobacco rod is largest near the combustion zone at the periphery of the smoking article and is approximately commensurate with the gradient of temperature, i.e., higher airflow is associated with larger temperature gradients. In a typical cigarette, the highest temperature gradient is from the combustion zone (>850-900° C.) axially toward the filter end of the cigarette. Within a few millimeters behind the combustion zone the temperature drops to near ambient. Further information on airflow patterns, the formation of constituents in cigarettes during smoking and smoke formation and delivery can be found in Richard R. Baker, "Mechanism of Smoke Formation and Delivery", Recent Advances in Tobacco Science, vol. 6, pp. 184-224, (1980) and Richard R. Baker, "Variation of the Gas Formation Regions within a Cigarette Combustion Coal during the Smoking Cycle", Beiträge zur Tabakforschung International, vol. 11, no. 1, pp. 1-17, (1981), the contents of both are incorporated herein by reference.

The conversion rate of CO to $CO_2$ and/or NO to $N_2$ by the patterned catalyst particles is enhanced by the rapid and efficient transport of CO and/or NO to the region of the catalyst and $CO_2$ and/or $N_2$ away from the region of the catalyst, e.g., via gas flow within the smoking article. Together, the operating temperature and the air flow within the smoking article can affect the operation of the catalyst.

The quantity, location and distribution on a wrapper of the patterned deposit can be selected as a function of the temperature and airflow characteristics exhibited during smoking in order to adjust, e.g., increase or maximize the conversion rate of CO to $CO_2$ and/or NO to $N_2$. The catalyst particles can be selected so as to catalyze and/or oxidize in a given temperature range, and the pattern geometry/distribution of the deposit can be selected in order to coincide with the appropriate temperature for catalysis/oxidation.

In many instances, a complete coating of print material upon regions of a wrapper tends to have a occlusive effect, which tends to inhibit diffusion of CO through the wrapper upstream of the coal. By pattern printing, regions of the cigarette wrapper are left unprinted and available to facilitate diffusion of CO through the wrapper, while at the same time the printed regions are present to contribute their catalytic effect. As a result, both diffusion and catalysis are engaged to reduce CO during smoking of the cigarette.

In embodiments of smoking articles described herein, any suitable tobacco mixture may be used for the cut filler. Examples of suitable types of tobacco materials include flue cured, Burley, Md. or Oriental tobaccos, the rare or specialty tobaccos, and blends thereof. The tobacco material can be provided in the form of tobacco lamina, processed tobacco materials such as volume expanded or puffed tobacco, processed tobacco stems such as cut rolled or cut puffed stems, reconstituted tobacco materials, or blends thereof. The tobacco can also include tobacco substitutes.

The tobacco column preferably comprises cut filler of a blend of tobaccos typical of the industry, including blends comprising bright, Burley and Oriental tobaccos and other blend components, including traditional cigarette flavors. In the preferred embodiment, the shredded tobacco (cut filler) of the tobacco column comprises a blend of bright, Burley, Md. and Oriental tobaccos with or without inclusion of reconstituted tobaccos or any after cut flavorings. Optionally, an expanded tobacco component might be included in the blend to adjust rod density, and flavors may be added. Optionally, a single variety of the aforementioned tobaccos may be used instead of a blend.

In cigarette manufacture, the tobacco is normally employed in the form of cut filler, i.e., in the form of shreds or strands cut into widths ranging from about 1/10 inch to about 1/20 inch or even 1/40 inch. The lengths of the strands range from between about 0.25 inches to about 3.0 inches. The cigarettes may further comprise one or more flavorants or other additives (e.g., burn additives, combustion modifying agents, coloring agents, binders, etc.).

A wrapper can be any wrapping surrounding the cut filler, including wrappers containing flax, hemp, kenaf, esparto grass, rice straw, cellulose and so forth. Optional filler materials, flavor additives, and burning additives can be included. In production of a smoking article such as a cigarette, the wrapper is wrapped around cut filler to form a tobacco rod portion of the smoking article by a cigarette making machine, which has previously been supplied or is continuously supplied with tobacco cut filler and one or more ribbons of wrapper. When supplied to the cigarette making machine, the wrapper can be supplied from a single bobbin in a continuous sheet (a monowrap) or from multiple bobbins (a multiwrap, such as a dual wrap from two bobbins). Further, the wrapper can have more than one layer in cross-section, such as in a bi-layer paper as disclosed in commonly-owned U.S. Pat. No. 5,143,098, the entire content of which is herein incorporated by reference.

Cigarettes may range from about 50 mm to about 120 mm in length. Generally, a regular cigarette is about 70 mm long, a "King Size" is about 85 mm long, a "Super King Size" is about 100 mm long, and a "Long" is usually about 120 mm in length. The circumference is from about 15 mm to about 30 mm in circumference, and preferably around 25 mm. The tobacco packing density is typically between the range of about 100 mg/cm$^3$ to about 300 mg/cm$^3$, and preferably 150 mg/cm$^3$ to about 275 mg/cm$^3$.

Figures 1A, 1B:
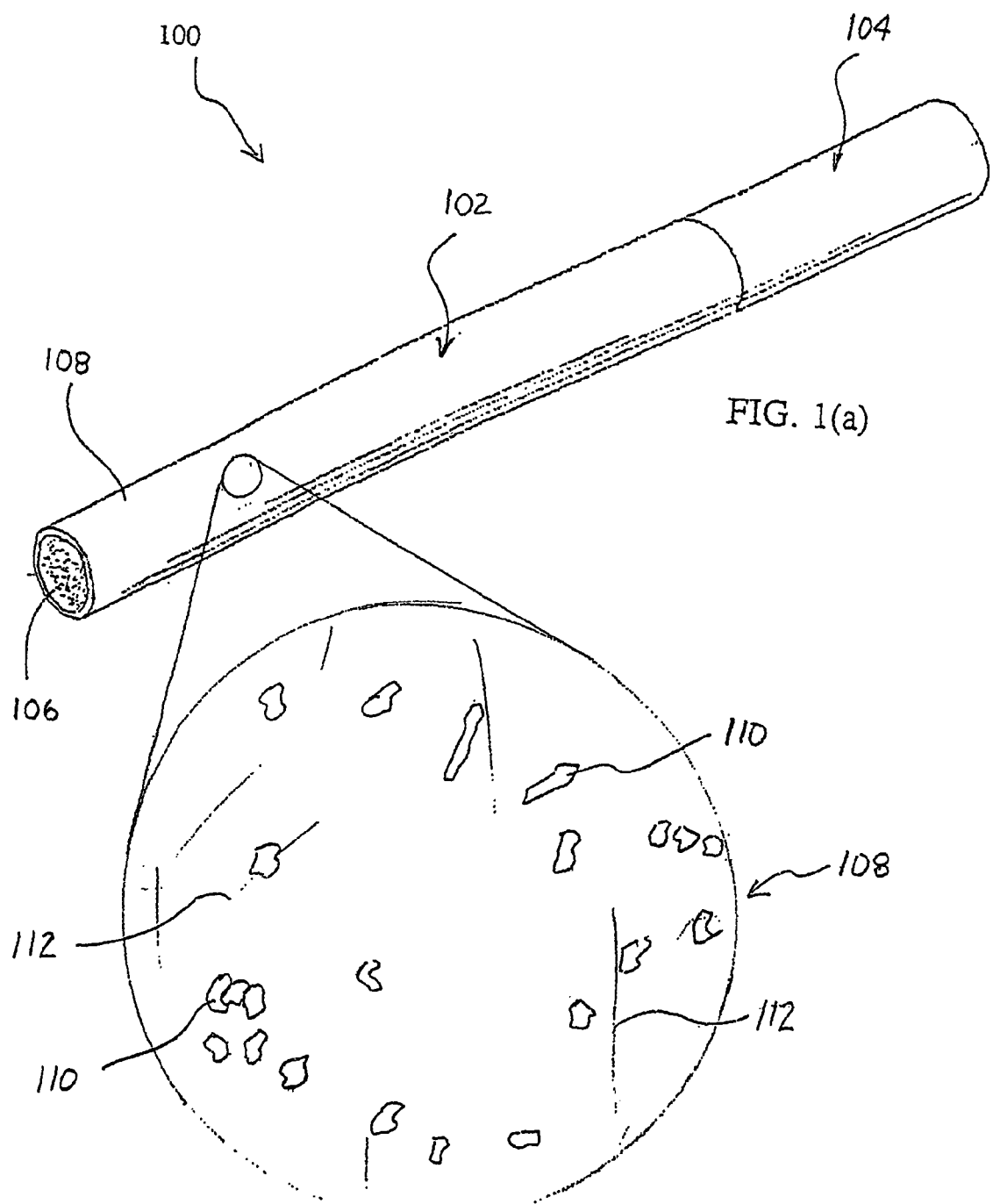
FIG. 1(a) shows an exemplary smoking article with a particulate catalyst supported on the web-filler material of the wrapper.
FIG. 1(b) shows a magnified view of the wrapper.

Referring to FIG. 1(a), a preferred embodiment of a smoking article 100 has a tobacco rod portion 102 and filtering tip 104. Optionally, embodiments of the smoking article 100 can be practiced without a filtering tip 104. Preferably, the tobacco rod portion 102 comprises a column of tobacco 106 that is enwrapped with a cigarette (tobacco) wrapper 108. As shown in expanded view in FIG. 1(b), a random deposit of catalyst particles 110 is on at least a portion of the surface of the wrapper 108. In practice, the catalyst particles 110 may penetrate an outer portion of the web of fibrous cellulosic material 112 that forms the base material of the wrapper 108.

The size distribution and the density of the catalyst particles on the surface of the wrapper can affect the permeability of the wrapper 108 (measured typically in units of CORESTA, which is defined as the amount of air, measured in cubic centimeters, that passes through one square centimeter of material in one minute at a pressure drop of 1.0 kilopascals).

The pattern of catalyst particles, which can comprise a random or regular array of features, can include a concentration gradient or distribution of the particles per unit area of the wrapper. For example, a concentration gradient of the catalyst within the pattern can vary between a first portion having a low concentration feature and a second portion having a high concentration feature. The total loading of the catalyst particles in a first, low concentration portion can be lower than that in a second, high concentration portion. The first, low concentration portion preferably has a total loading of catalyst less than about 1 mg, more preferably zero mg. The second, high concentration portion preferably has a total loading of catalyst less than about 100 mg, more preferably 1 to 50 mg. The first, low concentration portion and the second, high concentration portion can be, respectively, the linearly distal portion and the linearly proximal portion of the wrapper, with respect to an end of the smoking article, such as the end with a filtering tip, if present. In further embodiments, the loading of catalyst particles can vary continuously or discontinuously and/or linearly or non-linearly from the linearly distal portion to the linearly proximal portion.

The concentration gradient can be achieved by varying the surface area of the pattern (e.g., increasing the size of geometric features or the font size of alphanumeric features). Additionally, the concentration gradient can be achieved by varying the concentration of the catalyst in the slurry that is deposited (e.g., using a first concentration source in a first printing step and a second concentration source in a second printing step to form the deposit). By varying the concentration of the slurry that is deposited, it is possible to vary the thickness of the discrete features in the pattern (e.g., slurry having a high concentration of catalyst particles can be used to print a thicker feature than slurry having a low concentration of catalyst particles). A thicker feature has more particles per area of the patterned deposit. Finally, different catalyst material can be deposited (e.g., a first low activity catalyst material and a second high activity catalyst material can be used to form patterned deposits of varying catalytic activity). By way of example, patterned catalytic particles can be deposited using a single roller employing successive applications (e.g., using a different catalyst and/or catalyst concentration in each step), or by using multiple rollers wherein each roller deposited a particular catalyst and/or catalyst concentration.

The pattern of catalyst particles can decrease the permeability of the wrapper by reducing the surface area for the passage of air where the catalyst particles are printed. The wrapper onto which the pattern is deposited can be any suitable conventional wrapper. For example, a preferred wrapper having a patterned deposit thereon can have a basis weight of from about 18 g/m$^2$ to about 60 g/m$^2$ and a permeability of from about 15 CORESTA units to about 80 CORESTA units. More preferably, the wrapper has a basis weight from about 30 g/m$^2$ to about 45 g/m$^2$ and the permeability is about 30 to 35 CORESTA units. However, any suitable basis weight and permeability for the wrapper can be selected. The concentration of the deposited catalyst and the particle size can be adjusted to achieve desired results.

Preferably, the catalyst is deposited on the wrapper so that a permeability of the wrapper comprising the patterned deposit is no less than 15 CORESTA units, preferably from 30 to 40 CORESTA units. Other permeabilities of the wrapper (as measured by CORESTA units) can be selected based on the application and location of the wrapper. For example, in multilayer wrappers the permeability of a first layer can be less than 1,000 CORESTA units, although a permeability that is higher can be used. Thickness of single-layer wrapper can preferably be from 15 to 100 microns, more preferably from 20 to 50 microns. Additional layers in a multilayer wrapper can be from 0.1 to 10 times the permeability of the first layer and can have a thickness of from 0.1 to 2 times the thickness of the first layer. Both the permeability and the thickness of the first layer and the second layer can be selected to achieve a desired total air permeability and total thickness for the smoking article.

Referring again to FIG. 1, if desired the wrapper 108 can optionally include a pattern-free portion of a surface. It is to be understood that the patterned deposits shown on an outer surface of the wrapper 108 in FIGS. 1(a) and 1(b) can be on an inner surface of the wrapper or both on the inner and the outer surface, if desired.

Figures 2A, 2B:
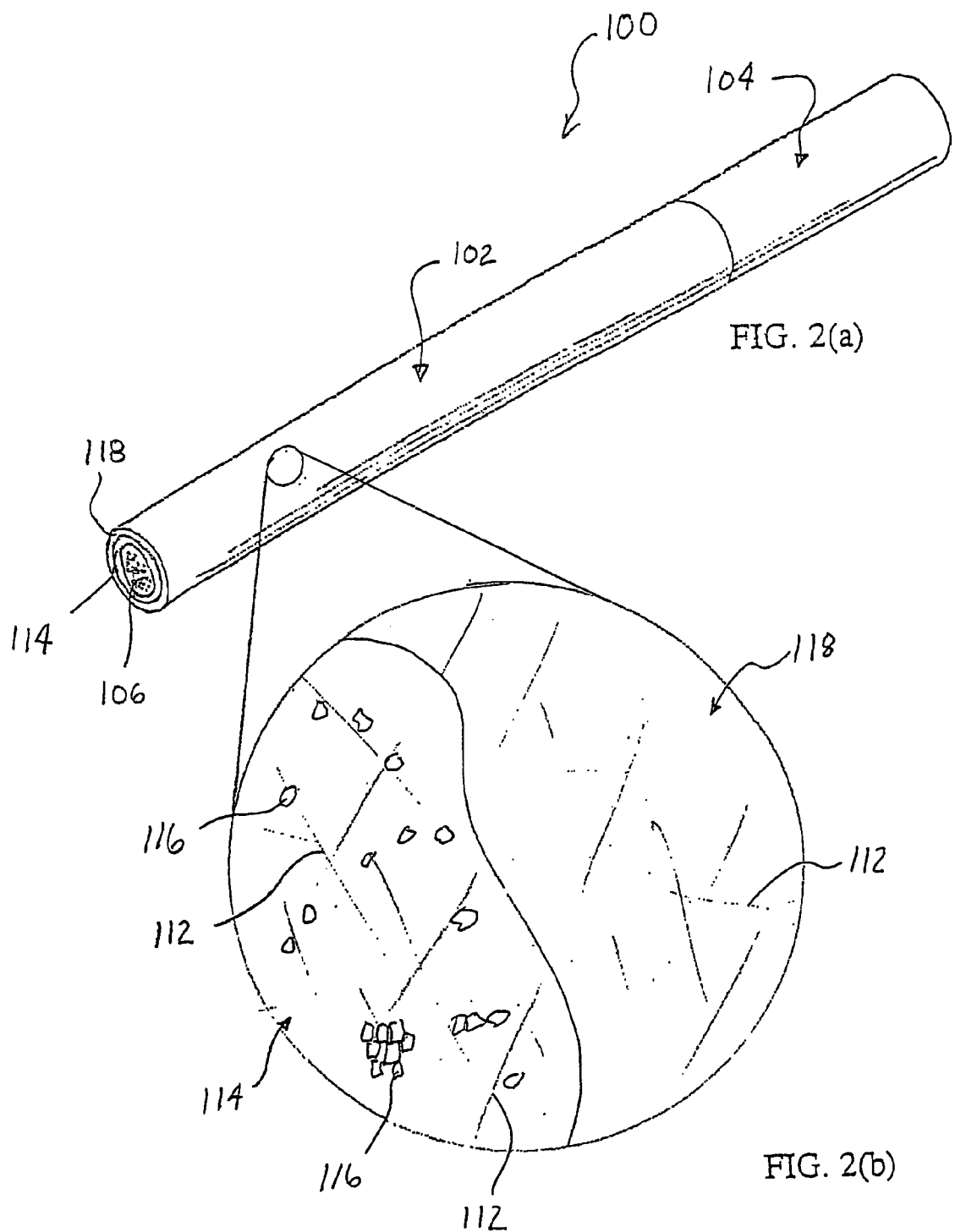
FIG. 2(a) shows an exemplary smoking article with a particulate catalyst supported on the web-filler material of a first wrapper with a second outermost wrapper.
FIG. 2(b) shows a magnified view of the first wrapper with a second outermost wrapper.

FIGS. 2(a) and 2(b) show an embodiment of a smoking article with a patterned deposit on a portion of the surface of a first wrapper with a second outermost wrapper. In the FIG. 2(a) embodiment, the smoking article 100 includes a cigarette tobacco column 106 surrounded by a first inner wrapper 114. As shown in expanded view in FIG. 2(b), a patterned deposit 116 is on the surface of at least a portion of the first wrapper 114. If desired, the first wrapper 114 can optionally include a deposit-free surface or a deposit-free portion of the surface.

In FIGS. 2(a) and 2(b), the smoking article 100 has a second wrapper 118 surrounding the first wrapper 114. The total amount of catalyst in the second outer wrapper 118 is preferably less than 1 mg for a given single smoking article 100, e.g., a single cigarette. In one preferred embodiment, the second wrapper 118 is catalyst free so as to provide an appearance to the cigarette 100 that is not affected by any coloration from the catalyst. In exemplary embodiments, a total amount of catalyst particles in the first wrapper is 1 to 100 mg and in the second wrapper is less than 1 mg, preferably 0 mg and/or a ratio, in weight percent, of a catalyst in the second wrapper 120 to the catalyst in the first wrapper 112 is less than 0.25. By way of example, a preferred amount of catalyst per cigarette is 1 to 100 mg, 1 to 50 mg or 50 to 100 mg, 2 to 25 mg or 25 to 50 mg, 1 to 15 mg or 15 to 40 mg, or 4 to 10 mg or 10 to 20 mg.

It is to be understood that the first wrapper and the second wrapper can be interchanged, if desired. For example, the outer second wrapper can comprise the patterned deposit and the inner first wrapper can have the same or a different arrangement of catalyst particles or can be catalyst-free. Further, if the deposit is not intended to be viewed, e.g., is not a pattern conveying a desired image and or message to a viewing consumer, it may be preferable from an aesthetic point of view to place the deposit on an inner surface of a first wrapper, since some catalysts can discolor the wrapper. An optional, catalyst-free, outer second wrapper can then be placed about the inner first wrapper.

Figure 3:
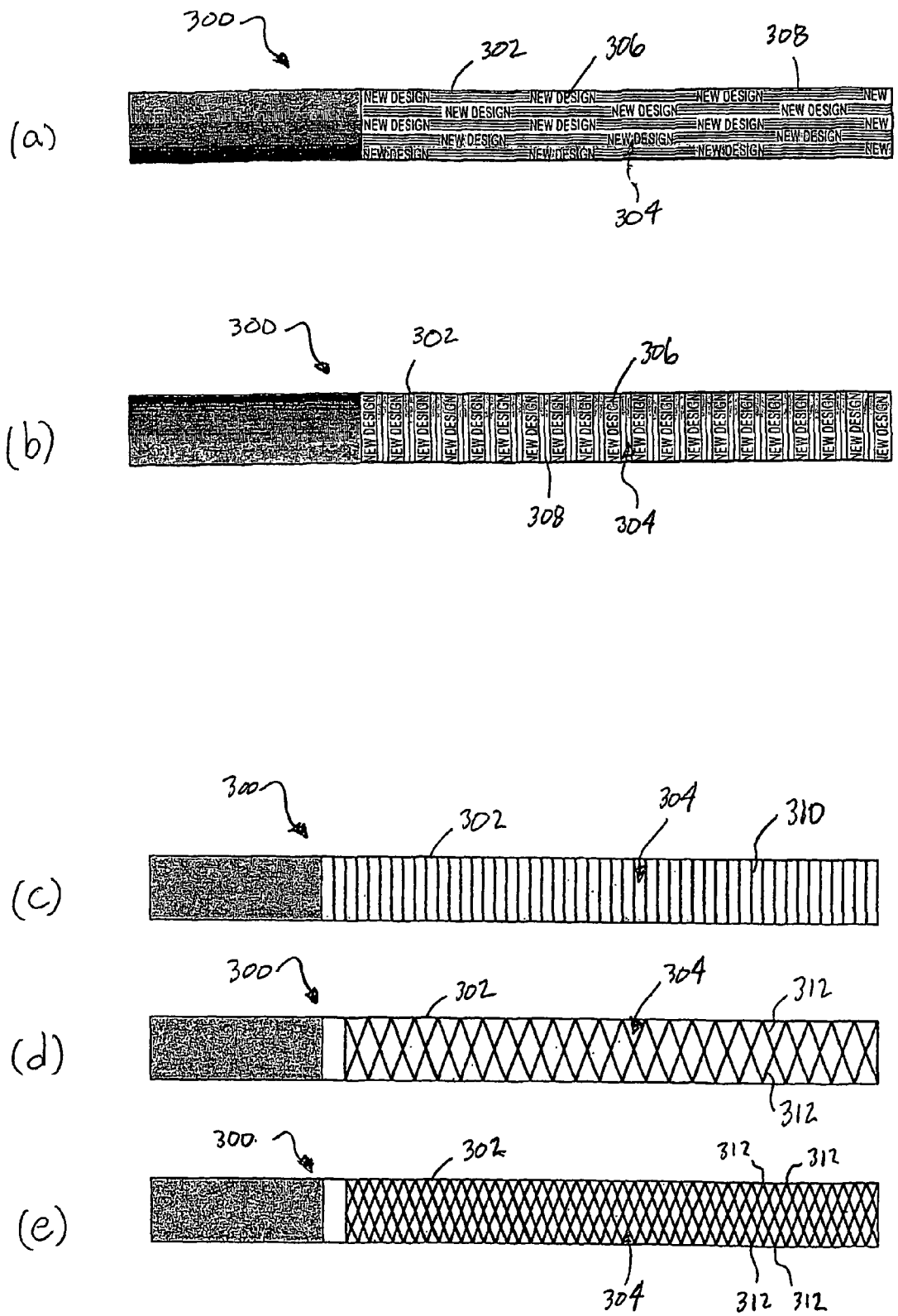

FIGS. 3(a) to 3(e) illustrate examples of regular patterns of catalyst particles on wrappers for smoking articles. The patterns comprise a plurality of discrete features. In exemplary embodiments, the discrete features include an alphanumeric sequence, a pictogram, or a geometric shape. Other optional forms of the pattern include a variety of discrete patterns, such as in the shape of crosshatch, ramps and/or gradients, irregular shapes, and the like. In FIGS. 3(a) and 3(b), the wrapper 302 of the smoking article 300 has a pattern 304 of discrete features including an alphanumeric sequence 306. The pattern 304 also includes a repeating series of geometric shapes, shown as lines 308. The pattern is repetitive in a first direction, either linearly or circumferentially along the length of the smoking article. The alphanumeric sequence 306 of the pattern 304 can be oriented as desired for a given aesthetic effect, e.g., can be oriented linearly (FIG. 3(a)) or circumferentially (FIG. 3(b)). In FIGS. 3(c) to 3(e), the wrapper 302 of the smoking article 300 has a pattern 304 of discrete features including a geometric shape. In the illustrated examples, the geometric shapes include a circumferential line 310 (FIG. 3(c)), and a series of overlapping helixes 312 of a first density (FIG. 3(d)) and a second, higher density (FIG. 3(e)).

In one approach, the catalyst particles are deposited onto the wrapper of a smoking article by printing techniques. For example, a cigarette made by conventional cigarette manufacturing techniques and having any conventional blend of tobacco and tobacco flavoring additives can have a pattern printed on the wrapping paper by procedures known in cigarette manufacturing. Such procedures generally involve the use of a soft impression roller or rollers of a desired configuration. A pick-up roller rotating in a slurry to be applied to the cigarette wrapper, e.g., a slurry containing catalyst particles dispersed in a liquid, serves to transfer the liquid to the impression roller for the printing step. A preferred slurry does not contain a binder. Similarly, patterns can be printed by the conventional techniques of gravure printing and flexographic printing and/or relief, intaglio, or other printing processes. The patterns can be incorporated onto the wrapping paper using size press techniques, painting techniques, rotogravure techniques, photogravure techniques, or the like. Other methods used to deposit catalyst particles on a surface of wrapping paper include electrostatic deposition, application with an adhesive, patterned application with a printing applicator, application in an ink solution using a printing process, spraying, brushing and the like. Further, the catalyst particles can be applied to a wrapper in a single coating step or in multiple coating steps utilizing printing techniques and controlling the amount of slurry applied in any one deposition. According to an embodiment, dry catalyst particles can be deposited on a wetted wrapper surface.

Pattern printing can be conducted by any one or a combination of the aforementioned printing techniques. Further, these printing operations can produce a patterned deposit of catalyst particles on wrappers of assembled cigarettes and/or on any side of a wrapper at any point prior to assembly of the cigarette.

In preferred embodiments, the catalyst particles are dispersed and/or suspended in an appropriate liquid to form a catalytic ink (e.g., slurry). Any rapid drying liquid can be used to form the slurry, for example, water, ethanol or acetone. The catalytic ink can also include other constituents, such as an aqueous component, a non-aqueous component, and/or a surfactant. Preferably the slurry is binder free. Further optional components of a catalytic ink include a rheology agent, which provides for proper transfer of the ink during the printing process. For printing on paper substrates, such as the wrapper used in smoking articles, the printing ink preferably is adapted to the paper substrate and may also include one or more of a resin, a solvent, a defoaming agent and a drier.

In optional embodiments, the catalytic ink includes a coloring agent, such as an organic or inorganic pigment. In an example of a coloring agent, the pigment is a silica-based pigment that produces a catalytic ink that results in a white dried catalytic deposit. In addition to or as an alternative to pigments, nanoparticle catalysts that impart a color or tint to the dried deposit can also be used. For example, titanium-based nanoparticle catalysts can impart a white color or shade to dried deposits.

The papermaking process can be carried out using conventional paper making equipment. Cigarette wrappers can comprise cellulosic material, which forms a web, and a web-filler, which can be used to control the permeability of the paper.

The support web can be a conventional web, such as a flax support web, or can include a web with an incorporated catalytic component, such as a nanoparticle catalyst. If the support web includes a catalytic component, the incorporated catalytic component can be supported on a web-filler material or can be directly supported on the support web without a web-filler material. The web-filler includes $CaCO_3$ particles or any other suitable web-filler material, such as an oxide, a carbonate, or a hydroxide of a Group II, Group III or Group IV metal, $CaCO_3$, $TiO_2$, silicates such as $SiO_2$, $Al_2O_3$, $MgCO_3$, $MgO$ and $Mg(OH)_2$.

The wrapper can comprise a laminated wrapper, a bi-layer wrapper or a multilayer wrapper. Examples of bi-layer and multilayer wrappers are disclosed in commonly-owned U.S. Pat. No. 5,143,098, the entire content of which is herein incorporated by reference.

In an embodiment of a bi-layer or multilayer wrapper including patterned deposits of catalyst particles, at least one surface of a radially inner layer and/or a radially outer layer can comprise the patterned deposit. Preferably, a radially innermost layer of the multilayer paper comprises the catalyst particles.

The wrapper having a patterned deposit of catalyst particles thereon can be used to manufacture conventional cigarettes or non-conventional cigarettes such as cigarettes for electrical smoking systems described in commonly-assigned U.S. Pat. Nos. 6,026,820; 5,988,176; 5,915,387; 5,692,526; 5,692,525; 5,666,976; 5,499,636 and 5,388,594 or non-traditional types of cigarettes having a fuel rod such as are described in commonly-assigned U.S. Pat. No. 5,345,951.

FIG. 4 illustrates one type of construction of a cigarette 300, which can be used with an electrical smoking device. As shown, the cigarette 300 includes a tobacco rod 360 and a filter portion 362 joined by tipping paper 364. The filter portion 362 preferably contains a tubular free-flow filter element 302 and a mouthpiece filter plug 304. The free-flow filter element 302 and mouthpiece filter plug 304 may be joined together as a combined plug 310 with plug wrap 312. The tobacco rod 360 can have various forms incorporating one or more of the following items: an overwrap 371, another tubular free-flow filter element 374, a cylindrical tobacco plug 380 preferably wrapped in a plug wrap 384, a tobacco web 366 comprising a base web 368, and a void space 391. The patterned deposit of catalyst particles, such as nanoscale catalyst particles, is preferably printed onto the overwrap 371, but in addition to or in the alternative, could be printed and/or deposited onto any one or more of the plug-wrap 384 or a component or components of the tobacco web 366.

FIG. 5 illustrates a cigarette 410 construction having a fuel element 411 as described in U.S. Pat. No. 5,345,951, the disclosure of which is hereby incorporated by reference. The cigarette 410 includes the fuel element 411 and an expansion tube 412 overwrapped by cigarette wrapping paper 414, and a filter element 413 attached by tipping paper 405. With reference to FIG. 6, the fuel element 411 includes a heat source 420 and a flavor bed 421 which releases flavored vapors and gases when contacted by hot gases flowing through one or more longitudinal passages in the heat source. The vapors pass into the expansion chamber 412 and then to mouthpiece element 413. The heat source may contain substantially pure carbon and optionally catalysts or burn additives. One or more layers of paper 418 surrounding the heat source 420 can have patterned catalyst particles printed thereon, e.g., by printing a pattern of catalytic ink, and can be used to reduce CO, NO and/or TPM produced by the heat source 420. Alternatively, or in addition thereto, paper having a patterned deposit can be provided downstream of the heat source 420. For example, paper comprising a patterned deposit on at least one surface thereof can be located between the heat source and the flavor bed 421 or in the flavor bed 421. Flavor bed 421 can include any material that releases desirable flavors, e.g., tobacco filler or a substrate on which flavor forming compounds (e.g., menthol) have been incorporated.

The fuel element 411 is housed in a composite sleeve having a radiant energy reflector sleeve 422 (e.g., perforated metallized paper) and optional inner sleeve 423 (e.g., perforated metallized paper). The inner sleeve 422 can be folded in to form a lip 424 at the upstream end thereof to hold the heat source suspended away from the interior wall of the reflector sleeve 422 with an annular space therebetween. Flavor bed 421 is held within inner sleeve 423. The wrapper 414 which holds the fuel element and expansion chamber 412 together preferably has sufficient porosity to allow air to be admitted through the paper 414 and support combustion of the heat source. The fuel element 411 also includes a reflective end cap 415 with one or more openings 416 to allow air into the fuel element 411. Smoking articles can include dual paper wrappers, e.g., an inner wrapper and an outer wrapper. If desired, the paper having a patterned catalytic deposit thereon can be used at other locations and/or for any of the paper layers of the cigarette shown in FIGS. 5 and 6. Further, while one embodiment of a fuel element cigarette is shown in FIGS. 5 and 6, paper comprising patterned catalytic particles can be used to surround the fuel element and/or in place of paper layers in other fuel element cigarette arrangements.

FIG. 7 illustrates a cigarette 500 having a concentric tobacco rod 510 that includes an inner tube or sheath of cigarette wrapper 515 having a patterned deposit of catalytic particles on at least a portion of one surface of the wrapper. As shown, the cigarette 500 comprises a filter 505 and a tobacco rod 510, which are attached to one another with tipping paper 511. The tobacco rod 510 is a "concentric core" or "coaxial" configuration that can be produced on a Hauni Baby rod making machine available from Hauni Machinenbau AG of Hamburg, Germany. An inner core region 512 is defined by the inner wrapper 515, which is surrounded by tobacco cut filler material 520. An outer cigarette wrapper 525 extends along the outside of the tobacco rod 510. The filter 505 can comprise one or more plugs of cellulose tow and optionally could include an adsorbent such as carbon. In this embodiment, any coloration caused by the deposit of catalyst particles on the paper in the inner wrapper 515 is hidden from view.

The central core region 512 can be hollow and/or can be partially or wholly filled with tobacco cut filler and is preferably approximately 2-5 mm in diameter, more preferably 2-3 mm in diameter. In one alternative, the inner wrapper 515 can be constructed in a layered arrangement with at least one of the layers formed of paper having a patterned deposit of catalyst particles on a surface thereof. The catalyst particles can be deposited on an inner surface of the inner wrapper, an outer surface of the inner wrapper, an inner surface of the outer wrapper and/or an outer surface of the outer wrapper.

Referring again to the embodiment of FIGS. 2(a) and 2(b), the inner wrapper and the outer wrapper are individual wrappers formed in separate papermaking processes and later wrapped around tobacco cut filler to from a cigarette tobacco rod. The inner wrapper, the outer wrapper or both wrappers can include dried deposits containing a nanoparticle catalyst. In examples where both wrappers include a patterned deposit of catalytic particles, the specific catalyst particles and the catalyst loading on each wrapper can be the same or different.

In some embodiments, the addition of catalyst particles can discolor the wrapper, e.g., the wrapper becomes non-white or brown. For aesthetic reasons, an outer wrapper that is a conventional color, e.g., white, can be placed around the inner wrapper. Both the inner wrapper and the outer wrapper can be selected to give a desired smoking article performance with respect to smoking article properties, such as puff count, tar, burn rate, and ash appearance. Accordingly and as shown and described, for example, with reference to FIGS. 2(a) and 2(b), preferred embodiments of smoking articles and methods of making smoking articles can include a tobacco rod portion of a cigarette with a patterned deposit of catalyst particles on a first wrapper, further comprising a second outermost wrapper, which does not have any catalyst particles deposited thereon.

A preferred catalyst for use on a wrapper for a smoking article is catalytically active at temperatures as low as ambient temperature and more preferably does not deactivate even at temperatures as high as 900° C. The catalyst particles can be printed along the entire axial length of the anticipated burn zone, e.g., not only at the filter end of the smoking article, and can be catalytically active from the lit end to the filter end during use. The axial distribution of the catalyst provides sufficient contact time between the mainstream smoke and the catalyst for CO to be converted to $CO_2$ and/or NO to be converted to $N_2$.

In a further example, the catalyst particles can comprise mixed catalyst, e.g., a catalyst that is a combination of individual catalyst compositions that each operate at a different temperature range or overlapping temperature ranges. Such a mixture of different catalyst particles can be used to broaden the temperature range at which conversion of CO to $CO_2$ and/or conversion of NO to $N_2$ can occur and to increase the catalytic efficiency of the catalyst as the smoking article burns. For example, a mixed catalyst may convert CO to $CO_2$ and/or NO to $N_2$ both at the combustion zone and behind the combustion zone.

When used on paper, the patterned catalyst can be selective to CO. Thus, CO can be reduced by a greater proportion than particulate matter (TPM). Thus, the CO:TPM ratio is reduced. A control cigarette was smoked on a commercial smoking machine and the amount of particulate matter and carbon monoxide in the mainstream smoke was measured. The control cigarette comprised a conventional wrapper. The mainstream smoke constituents for a test cigarette comprising a wrapper having 12.5% by weight nanoscale iron oxide particles printed on the inside of the wrapper were also measured. The total particulate matter (TPM) and amount of carbon monoxide (CO) issuing from the control cigarette were 18.3 mg and 14.7 mg, respectively. The TPM and CO amounts for the test cigarette were 12.9 mg and 7.6 mg, respectively, corresponding to a reduction in TPM and CO of 30% and 48%.

Any of the deposit material, wrappers, smoking articles or methods described herein can include additional additives conventionally used in wrappers for smoking articles. These additives can include, for example, additives to control the appearance, e.g., color, of the wrapper, additives to control the burn rate of the wrapper, and/or additives to result in a desired ash appearance and/or web-fillers used in cigarette paper.

Although the present invention has been described in connection with exemplary embodiments thereof, it will be appreciated by those skilled in the art that additions, deletions, modifications, and substitutions not specifically described may be made without departing from the spirit and scope of the invention as defined in the appended claims.

What is claimed is:

1. A smoking article comprising:
a tobacco rod having a wrapper formed around the tobacco rod, the wrapper including a patterned deposit on at least a portion of one surface of the wrapper,
wherein the patterned deposit comprises catalyst particles capable of catalyzing, oxidizing and/or reducing the conversion of a constituent gas component in the mainstream and/or sidestream smoke of the smoking article, and
wherein the patterned deposit includes a concentration gradient of the catalyst between a first portion having a low concentration feature and a second portion having a high concentration feature, wherein the first portion and the second portion respectively are a linearly distal portion and a linearly proximate portion of the wrapper with respect to an end of the wrapper.

2. The smoking article of claim 1, wherein:
(a) the constituent gas component is carbon monoxide and/or nitric oxide;
(b) the catalyst is capable of reducing the amount of smoke constituents other than carbon monoxide and nitric oxide;
(c) the average particle size of the catalyst is less than about 5 microns or less than about 50 nm;
(d) the catalyst comprises at least one oxide of at least one element selected from the group consisting of B, Al, Si, Ti, Fe, Co, Ni, Cu, Zn, Ge, Zr, Nb, Mo, Ru, Rh, Pd, Ag, Sn, Ce, Hf, Ta, W, Re, Os, Jr, Pt and Au;
(e) the catalyst consists essentially of at least one oxide of at least one element selected from the group consisting of B, Al, Si, Ti, Fe, Co, Ni, Cu, Zn, Ge, Zr, Nb, Mo, Ru, Rh, Pd, Ag, Sn, Ce, Hf, Ta, W, Re, Os, Jr. Pt and Au;
(f) the deposit is binder-free;
(g) the catalyst comprises iron oxide;
(h) the catalyst comprises FeOOH, $Fe_3O_4$ $\alpha\text{-}Fe_2O_3$, $\gamma\text{-}Fe_2O_3$, FeO or mixtures thereof;
(i) the deposit includes a pattern having a plurality of discrete features including an alphanumeric sequence, a pictogram or a geometric shape;
(j) the features of the pattern are repetitive along an axial direction of the smoking article;
(k) the catalyst is deposited on an inner surface of the wrapper;
(l) the catalyst is deposited on an outer surface of the wrapper;
(m) the permeability of the wrapper is no less than 15 CORESTA units;
(n) the areal coverage of catalyst on the wrapper is less than about 90% or less than about 50% of the total surface area of the wrapper;
(o) the areal coverage of catalyst on the wrapper is greater than about 1% or greater than about 5% of the total surface area of the wrapper;
(p) the features of the pattern repeat such that the largest area of uncoated wrapper does not exceed a circular area having a diameter of 1 micron or a diameter of 10 mm;
(q) the total amount of the catalyst is less than about 10 mg/smoking article or less than about 100 mg/smoking article;
(r) the particles are deposited in an amount effective to reduce the concentration in mainstream and/or sidestream smoke of carbon monoxide and/or nitric oxide by at least 10% or by at least 25%; and/or
(s) the catalyst is hydrogen bonded to the wrapper.

3. The smoking article of claim 1, wherein:
(a) the catalyst comprises particles of a first oxide supported on particles of a second compound; or
(b) the catalyst comprises particles of a first oxide supported on particles of a second compound, the second compound comprises calcium carbonate.

4. The smoking article of claim 1, wherein:
(a) the wrapper is a first wrapper and the smoking article further comprises a second wrapper;
(b) the wrapper is a first wrapper and the smoking article further comprises a second wrapper, the second wrapper is radially outward of the first wrapper;
(c) the wrapper is a first wrapper and the smoking article further comprises a second wrapper, the total amount of catalyst on the second wrapper is zero; or
(d) the wrapper is a first wrapper and the smoking article further comprises a second wrapper, a ratio, in weight percent, of catalyst on the second wrapper to catalyst on the first wrapper is less than 0.25.

5. The smoking article of claim 1, wherein:
the linearly distal portion has a first loading of the catalyst and the linearly proximal portion has a second loading of the catalyst, the first loading of the catalyst is less than the second loading of the catalyst.

\* \* \* \* \*